United States Patent [19]

Kugler et al.

[11] Patent Number: 4,630,507

[45] Date of Patent: Dec. 23, 1986

[54] DRIVE SYSTEM WITH FLOW BRAKE

[75] Inventors: Artur Kugler, Augsburg; Rudi Reppert, Fussen; Franz-Xaver Zaunberger, Augsburg, all of Fed. Rep. of Germany

[73] Assignee: Zahnraderfabrik Renk Aktiengesellschaft, Augsburg, Fed. Rep. of Germany

[21] Appl. No.: 617,971

[22] Filed: Jun. 6, 1984

[30] Foreign Application Priority Data

Jun. 18, 1983 [DE] Fed. Rep. of Germany ....... 3321948

[51] Int. Cl.$^4$ ...................... F16H 47/04; B60K 41/28
[52] U.S. Cl. ........................................ 74/733; 74/862; 192/4 B; 192/9; 192/0.09
[58] Field of Search ............... 192/0.082, 4 B, 9, 0.09, 192/0.046; 74/411.5, 645, 731, 732, 733, 790, 862, 866, 752 A

[56] References Cited

U.S. PATENT DOCUMENTS

| | | | |
|---|---|---|---|
| 2,978,928 | 4/1961 | Tuck et al. | 74/645 |
| 3,863,739 | 2/1975 | Schaefer et al. | 192/4 B |
| 3,931,870 | 1/1976 | Memmer | 192/4 B |
| 4,314,487 | 2/1982 | Ahlen | 74/645 |

FOREIGN PATENT DOCUMENTS 2536805  8/1985  Fed. Rep. of Germany .

OTHER PUBLICATIONS

ATZ Automobiltechnische Zeitschrift, 75 (1973), No. 12, pp. 442–447.

Primary Examiner—George H. Kirzmanich
Attorney, Agent, or Firm—Natter & Natter

[57] ABSTRACT

A vehicle drive system includes a torque converter interconnecting an engine and a speed change gear and a flow brake is drivingly positioned between the torque converter and the speed change gear. A rotor of the flow brake is driven from a drive train which includes a torque converter turbine and the primary side of the speed change gear. During a braking cycle, the speed change gear is downshifted by one or more steps to increase the rotational speed of the flow brake rotor and generate a high braking moment. Because of high rotor speed, the flow brake is relatively small. The torque converter includes a bypass clutch which is disengaged during braking to permit negative slip in the torque converter and prevent excessive engine speed. The total braking load is distributed over the speed change gear, the flow brake, the torque converter and the engine. In addition, an engine brake and vehicle mechanical friction brakes may be employed. Preferably the flow brake actuation, speed change gear shifting, bypass clutch disengagement and engine brake actuation are under the automatic control of a programed controller.

10 Claims, 2 Drawing Figures

DRIVE SYSTEM WITH FLOW BRAKE

TECHNICAL FIELD

The invention relates to vehicle driving and braking systems and more particularly to a drive system having a speed change gear and a flow brake.

BACKGROUND ART

Flow brakes or retarders have been used in vehicle drive systems as sustained action brakes or as service brakes in combination with friction brakes. Such uses of flow brakes have been generally confined to either of two drive system configurations. In one configuration, the flow brake was engaged by the output shaft of a speed change gear, while in the other, the brake was engaged by the vehicle engine. When the flow brake was engaged by the vehicle engine it was referred to as a primary retarder.

Many disadvantages were encountered with the use of flow brakes in either configuration. For example, where the flow brake was engaged by the output shaft of the speed change gear, large flow brake dimensions were required in order to provide adequate braking effect over a large input speed range, i.e. vehicle speed range. This resulted in power dissipation problems because no load losses were incurred even after the fluid medium had been evacuated. Large flow brakes generated relatively high no load torques through air flow resistance. Additional components were required to reduce air flow losses. Such components included diaphragms to preclude air ventilation.

With the flow brake in the primary retarder configuration, the brake was engaged by the engine output shaft and, in each speed of the speed change gear, its braking power increased sharply with rotational speed and reached the same value in each gear speed at the rated speed of the engine. This effect was substantially the same as that of a motor brake.

Further, the primary retarders did not usually include mechanisms for avoiding no load losses when disengaged, such as ventilation blocking diaphragms. Thus, if they were dimensioned for sufficient braking moments, significant no load losses occurred in all speeds. Additionally, retarders were not infinitely variable.

In the other configuration, with the flow brake at the output end of the speed change gear, the braking moments differed greatly in the individual shift speeds, because of the different gear ratios, and high braking moments were attained only in the lower shift speeds.

DISCLOSURE OF THE INVENTION

In compendium, the present invention comprises a vehicle drive and brake system and method wherein a flow brake is positioned between a torque converter and a speed change gear and the speed change gear is downshifted by one or more speeds during a braking cycle. The flow brake is thus driven through the speed change gear at a speed greater than the maximum drive motor speed because of the slippage between the primary and secondary sides of the torque converter during braking.

Because the flow brake is driven at high operating speeds, it can be much smaller than those presently used in known systems. Under no load conditions with fluid evacuated, the flow brake will produce much smaller torque as a result of enclosed air and ventilation losses will be minimal without the use of ventilation flap valves or diaphragms.

Additionally, total vehicle braking is distributed over several drive system components which are normally utilized in the vehicle. By manually or automatically downshifting to a lower speed, part of the braking energy is absorbed by the speed change gear. With the speed change gear in a lower speed, the flow brake rotor rotates at an increased speed so that the flow brake produces a high braking moment.

Further, the turbine of the torque converter, driven from the primary end of the speed change gear, rotates faster than the torque converter pump wheel and provides braking torque. The turbine of the torque converter also increases engine speed and the engine itself is thus employed for braking purposes. Excessive engine speed is prevented by the slip present between the turbine of the torque converter and the pump wheel. Thus, total braking energy required to slow or stop the vehicle is distributed over several structural components of the drive system and heat generated during braking is dissipated throughout the drive system such that no additional cooling devices are necessary.

The individual structural components of the drive system can be actuated for a braking cycle either simultaneously or in a phased relationship. In a preferred embodiment, a control circuit including a microprocessor is utilized for controlling the various drive system components to effect a braking cycle. Optimal results are achieved when a drive system includes an automatically controlled shiftable under load speed change gear with a connected torque converter.

Pursuant to the invention, when a braking cycle requiring a high braking moment is initiated, the speed change gear is automatically downshifted one or more speeds, preferably before the flow brake is completely filled with fluid. Simultaneously, a bypass clutch in the torque converter is released so that the turbine speed of the torque converter and the rotor speed of the flow brake are increased while the engine speed remains within a permissible range. Overspeeding of the engine is prevented because of the negative slip in the torque converter. Additionally, a motor brake associated with the drive engine can be utilized.

From the foregoing compendium, it will be appreciated that it is an aspect of the present invention to provide a vehicle braking system of the general character described which is not subject to the disadvantages of the prior art aforementioned.

A further aspect of the present invention is to provide an improved vehicle braking system of the general character described which is both efficient and economical.

Another aspect of the present invention is to provide a vehicle braking system of the general character described which maximizes braking power while minimizing size and weight.

A further aspect of the present invention is to provide a vehicle braking system of the general character described including a flow brake and which system produces high braking torques with relatively low no load losses in the absence of ventilation control devices.

An additional feature of the present invention is to provide a vehicle braking system of the general character described wherein braking load is distributed over a plurality of drive system components.

An additional aspect of the present invention is to provide a vehicle braking system of the general character described wherein braking power is distributed over a flow brake, a speed change gear, the vehicle engine and a torque converter interconnecting the engine and the speed change gear.

Yet another feature of the present invention is to provide a vehicle braking system of the general character described which includes a flow brake driven from the input side of a speed change gear and a system for automatically controlling downshifts of the speed change gear during a braking cycle.

Another feature of the present invention is to provide a vehicle braking system of the general character described suited for efficient and economical utilization in heavy land and rail vehicles.

An additional aspect of the present invention is to provide a vehicle braking system of the general character described which relieves deceleration and sustained action braking loads from mechanical friction brakes of a vehicle.

A further feature of the present invention is to provide a vehicle braking system of the general character described wherein heat generated during a braking cycle is dissipated among a plurality of drive system components.

Other features and aspects of the present invention will in part be obvious and will in part be pointed out hereinafter.

With these ends in view, the invention finds embodiment in various combinations of elements and arrangements of parts and series of steps by which the said features and certain other features and aspects are hereinafter attained, all as more fully described with reference to the accompanying drawings and the scope of which is more particularly pointed out and indicated in the appended claims.

BRIEF DESCRIPTION OF THE DRAWINGS

In the accompanying drawings in which are shown some of the various possible exemplary embodiments of the invention.

DESCRIPTION OF THE PREFERRED EMBODIMENTS

Figure 1:
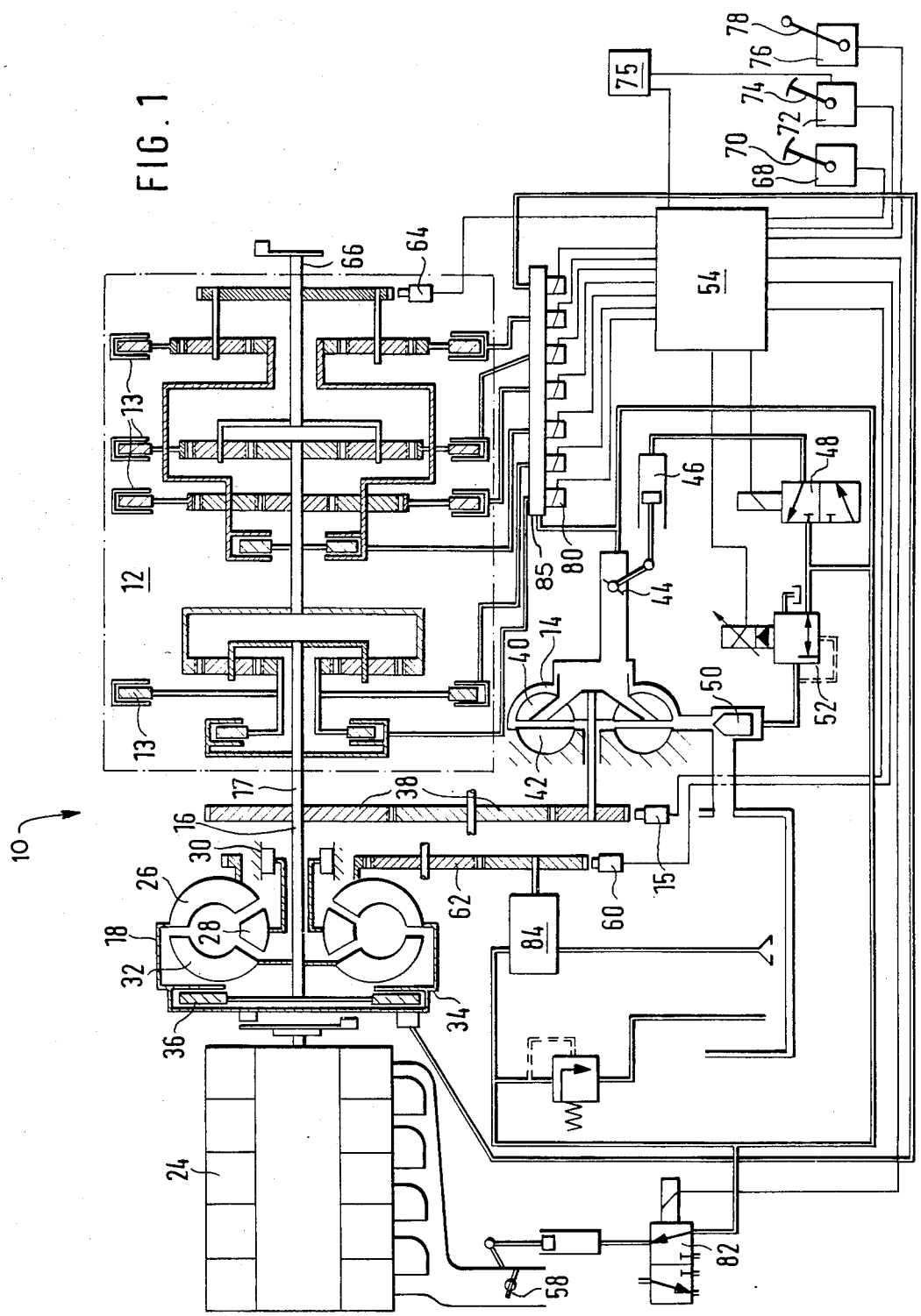
FIG. 1 is a schematized illustration of a vehicle drive system including a braking system constructed in accordance with and embodying the present invention and showing a flow brake driven from the input side of a speed change gear through a gear train.

In accordance with the present invention, a vehicle drive system includes a torque converter interconnecting a drive engine and a speed change gear. A flow brake is positioned between the torque converter and the speed change gear. During a braking cycle, the speed change gear is downshifted by one or more speeds and slip occurs between the primary and secondary sides of the torque converter. The flow brake, driven from the primary side of the speed change gear is thus driven at a speed greater than the maximum engine speed.

The braking system of the present invention provides for efficient economical operation, is relatively low in cost and suitable for heavy road and rail vehicles with diesel engines or gas turbine drives and with automatic multistage speed change gearings shiftable under load. Ideally, the braking system is incorporated as integral components of a drive system which comprises a vehicle engine, a transmission and a cooling system.

Both normal and moderate decelerations of 0.052–0.4 g are within the capabilities of the braking system as well as sustained action braking at approximately constant vehicle velocity at all inclines on which the vehicle is approved for travel. Additionally, the present invention relieves the braking load of mechanical friction brakes which continue to be utilized for safety purposes including emergency braking and parking.

Operator regulations of the braking system to provide a braking moment of desired value is effected by driving a variable flow brake from the primary side of a speed change gear and controlling the brake and gear under a shifting and a switching program.

The present invention takes advantage of the phenomenon that the braking moment of a flow brake increases with the square ($10^2$) of its rotor speed and the braking power increases with the cube ($10^3$) of the rotor speed. Due to relatively high operating speeds of the flow brake rotor, the flow brake can be made very small and light. In the context of the present systems, the flow brake can be designed at maximum oil filling for only twenty-five percent (25%) to two hundred percent (200%) of the rated power of the drive engine. This results in a flow brake much smaller than utilized in presently known systems.

Power dissipation, due to enclosed air at normal travel (no load) when the flow brake is evacuated, is at the rated speed of the drive engine, only 0.05% to 0.4% of the rated drive engine power without need for any additional no load loss reduction measures such as, for example, ventilation diaphragms.

High braking action is achieved by downshifting the speed change gear one or two speeds and, if a bypass clutch is present in the torque converter, disengaging such clutch.

Preferably, the speed change gear is automatically downshifted at the commencement of a braking cycle before the flow brake is completely filled with fluid in order to protect the shifting elements of the speed change gear. This procedure is also desirable when the speed change gear is a shift gear which is shiftable under load as employed in heavy vehicles.

Due to the downshifting of the speed change gear, rotational speed of the torque converter turbine and of the flow brake rotor increases by one, two or more increments in accordance with the downshifted gear ratios. This normally would mean a speed increase by a factor of 1.25 to 1.5 and for a two-speed downshift by a factor of 1.6 to 2.25. The drive motor speed, however, when the bypass clutch is disengaged, will not be increased beyond the permissible limit.

Because the power consumption of a flow brake increases with the cube of rotational speed, the braking power is increased by a factor of 1.95 to 3.57 when the speed change gear is downshifted one speed and by a factor of 4.12 to 11.4 when downshifted two speeds.

Depending upon the dimensional layout of the flow brake and the selection of the shifting program, the braking power can be rated for a wide range and can also be controlled during the braking process within wide limits. The maximum attainable braking power of about 50% to 100% of the rated power of the drive motor is safely sufficient also for braking at high speeds.

The braking energy is preferably distributed over several drive system components which are ordinarily employed in a vehicle drive system for normal driving and braking functions. As such, braking efficiencies heretofore unattainable have been achieved under the present invention. For example, by downshifting the speed change gear to a lower speed, part of the braking energy required to dissipate the vehicle momentum as it engages the terrain is supplied through the downshifted speed change gear. With the speed change gear at a lower speed, the flow brake rotor is rotated at increased speed so that the flow brake generates a high braking moment. As previously mentioned, the flow brake is filled during the braking cycle or is being filled during commencement of the braking cycle.

Due to the increased speed at the primary end of the speed change gear and concomitant increased flow brake speed, the torque converter turbine is driven faster than the torque converter pump wheel producing negative slip. Thus, the torque converter also generates a portion of the total required braking energy.

The negative slip in the torque converter also serves to increase the vehicle engine speed so that the engine also bears a portion of the total required braking energy. Overspeeding of the engine is prevented by the slip in the torque converter. The portion of the braking energy supplied by the accelerating engine can also be augmented with a primary retarder coupled to the engine.

With all of the drive system components supplying portions of the total required braking energy, the individual components can be loaded up to their permissible maximums and no additional cooling media will be necessary to dissipate the heat generated.

The individual drive system components which contribute portions of the total required braking energy can be actuated, as needed, either in staggered relationship or simultaneously under the influence of a control circuit preferably controlled by a programed microprocessor. The control circuit serves to regulate the braking moment to a desired value by control of fluid entry and evacuation of the flow brake along with controlling a shifting and switching cycle.

For the purpose of generating the requisite braking power under the invention, the following system elements are employed:

An automatically controlled speed change gear shiftable under load;

A drive motor—in the instance of the drive motor comprising a diesel engine, the engine preferably includes an exhaust brake or Jacobs brake; in the instance wherein the motor comprises a gas turbine, the turbine is preferably accompanied by a brake effected by impeller adjustment of the main turbine;

A torque converter drivingly interconnecting the drive motor and the primary side of the speed change gear including an automatic drive;

A variable flow brake integrated into the drive system between the speed change gear and the torque converter; and An engine cooling system and a transmission cooling system.

A salient aspect of the present invention resides in the flow brake which is driven from the primary side of the speed change gear and preferably driven at an increased speed due to downshifting of the speed change gear.

Referring now in detail to FIG. 1 of the drawings, the reference numeral 10 denotes generally a vehicle drive system which includes a flow brake 14 and a control system in accordance with the present invention. Included in the drive system is an engine 24 which may comprise an internal combustion engine, e.g. a diesel engine, or a gas turbine engine. The engine 24 drives a primary input shaft 17 of a speed change gear 12 having an output shaft 66. The speed change gear 12 may comprise, for example, a six speed shiftable under load gearing having a plurality of hydraulically controlled shift elements 13 which are engageable pursuant to a programed control system to be described subsequently.

Drivingly interconnecting the output of the engine 24 and the primary input shaft 17 of the speed change gear 12 is a torque converter 18. The output shaft of the engine 24 is nonrotatably coupled to the primary part or pump wheel 26 of the torque converter 18. The torque converter 18 includes a stater 28 which is restrained from rotation during a braking cycle by a free wheeling brake 30.

A turbine 32 of the torque converter 18 is joined to a torque converter output shaft 16 which is non-rotatably coupled to the primary input shaft 17 of the speed change gear. The torque converter output shaft 16 is fixed to a bypass clutch 36 which engages a plate 34 fixed to the pump wheel 26 for selective slip free direct driving from the engine output to the primary input shaft 17.

The flow brake 14 is driven from the primary input shaft 17 of the speed change gear 12 through a spur gear train 38 which engages and drives a flow brake rotor 40. The flow brake 14 also includes a stator 42 and a fluid inlet butterfly valve 44 which is controlled by a hydraulic cylinder 46. The flow of fluid to the cylinder 46 is controlled by a solenoid valve 48 which receives signals from an electronic controller 54. A solenoid operated proportional valve 52 directs control fluid flow to an outlet or drain valve 50 of the flow brake 14.

As previously mentioned, the filling and evacuation of the flow brake 14 is under the control of a programmed control system. The programed control system includes the controller 54 which may comprise a preprogramed microprocessor chip. The controller 54 receives signals from various sensors positioned throughout the drive system 10 and generates appropriate control signals in accordance with operator controls and sensed system parameters pursuant to its program. The drive system 10 includes operator controls such as an accelerator 70, a brake pedal 74, and a program selector 78. The brake pedal 74 is employed, in a conventional manner, to actuate a conventional mechanical friction braking system 75 schematically depicted in the drawings. A sensor 68, 72, 76 is associated with each of the operator controls 70, 74, 78 and provides a proportional analog or a digital signal indicative of the operator set position of its respective control with the signals being supplied as input signals to the controller 54. The controller 54 also receives input signals indicative of the engine speed through a sensor 60 which senses the speed of a spur gear driven from the torque converter pump wheel 26 through an idler gear 62. Additionally, a signal indicative of the primary input speed of the speed change gear is generated by a sensor 15 which is responsive to the speed of a spur gear fixed to the flow brake rotor and driven by the gear train 38. A further sensor 64 generates a signal which reflects the speed of the output shaft 66 of the speed change gear 12. The signals generated by the sensors 60, 15 and 64 are received by the electronic controller 54 as input signals.

The electronic controller 54 generates numerous electrical output control signals for the purpose of controlling a braking cycle in accordance with the invention. As previously mentioned, the braking cycle includes downshifting the speed change gear 12 one or more steps, preferably prior to or during the filling of the flow brake 14 with fluid. Additionally, the controller 54 simultaneously disengages the torque converter bypass clutch 36 so that negative slip will occur in the torque converter 18. For the purpose of further augmenting the effect of engine braking power, the controller 54 also actuates an engine brake, depicted in FIG. 1 as an exhaust brake 58.

For the purpose of providing pressurized fluid for a fluid control circuit, an oil pump 84 is driven by the torque converter pump wheel 26 through the idler gear 62. The fluid control circuit effects clutch disengagements, speed change gear 12 shifting functions, engine braking and actuation of the flow pump. In addition, the oil pump 84 provides operating fluid for the torque converter and the flow brake 14. Pressurized fluid from the pump extends to a manifold 85 for controlling the shift elements 13 of the speed change gear 12. The manifold 85 distributes control fluid to each of the shift elements through a plurality of solenoid valves 80 each of which are controlled by a control signal from the controller 54.

As previously mentioned, the flow brake 14 is filled under the control of a butterfly valve 44 which in turn is controlled by a cylinder 46 which receives pressurized fluid through a solenoid valve 48. Drainage of the fluid in the flow brake 14 is controlled by a drain valve 50 which is under the influence of pressurized fluid controlled by the solenoid operated proportional valve 52. Thus, operation and regulation of the flow brake 14 occurs under the program of the controller 54 and through the valves 48 and 52.

It should be additionally noted that a control fluid line from the fluid manifold 85 is connected to the bypass clutch 36 for coordinated release of the bypass clutch 36 thus permitting the primary input shaft 17 of the speed change gear 12 to rotate faster than the engine 24. The engine brake 58 is controlled through a hydraulic cylinder which receives fluid under the influence of a solenoid valve 82 which receives output signals of the controller 54.

Thus, a complete braking cycle is automatically sequenced dependent upon the position of the operator controls 70, 74, the engine speed, the vehicle speed (output shaft 66 speed), the flow brake rotor speed (input shaft 17 speed) and the selected switching and braking program as determined by the operator set program selector 78.

Figure 2:
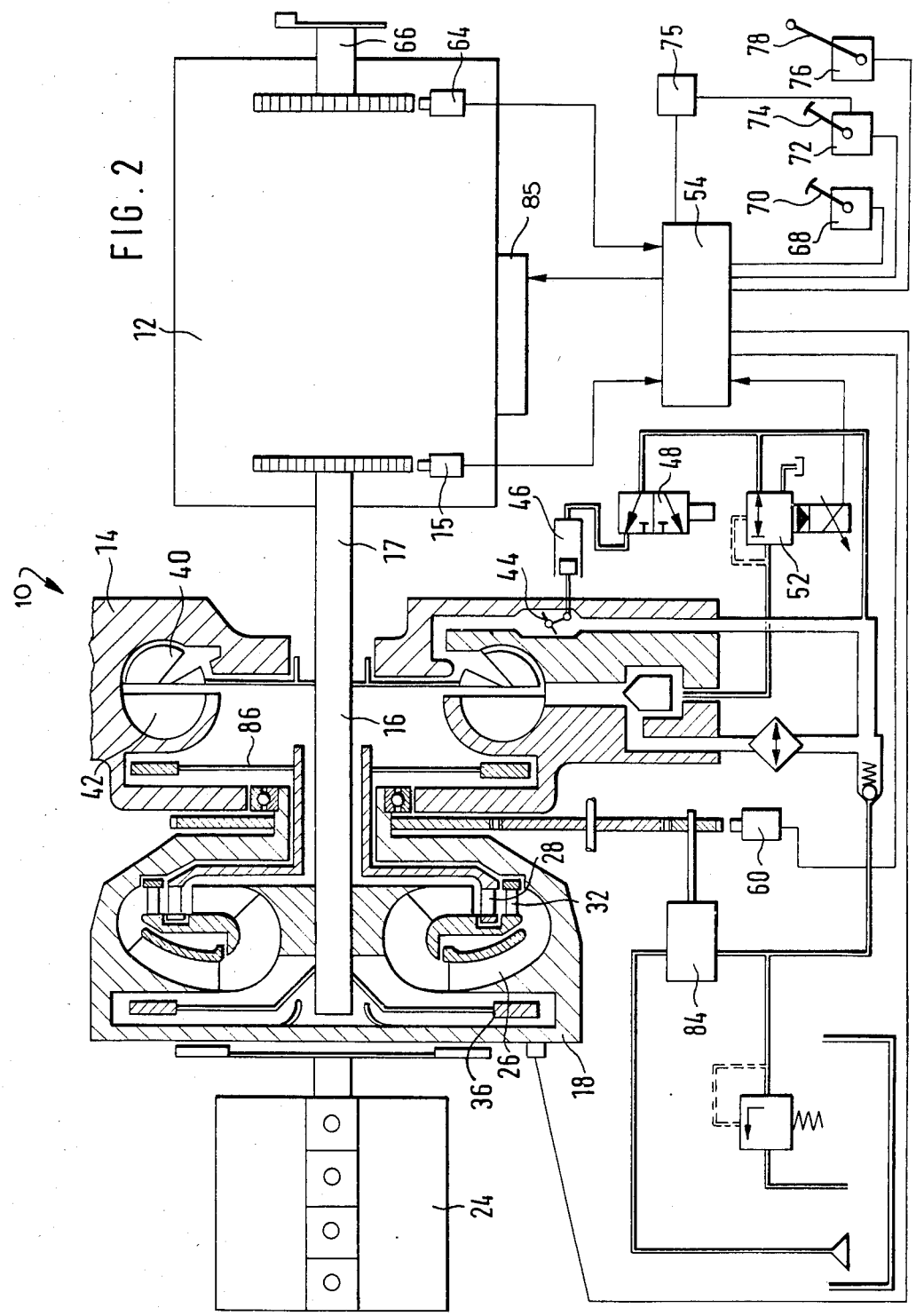
FIG. 2 is a schematized illustration of a further embodiment of the present invention wherein the flow brake is directly driven from the input side of the speed change gear.

An alternate embodiment of the drive system 10 wherein a flow brake 14 is disposed on a turbine shaft 16 is illustrated in FIG. 2. In other respects, this embodiment is substantially similar to that of FIG. 1. For the sake of simplicity in correlating the corresponding components of this embodiment and the embodiment heretofore described, the same reference numerals employed in describing components of the prior embodiment are employed to designate the equivalent components of this embodiment. By the arrangement of this embodiment, the gear train 38 previously employed to drive the flow brake rotor of the prior embodiment is eliminated and a flow brake rotor 40 is fixed to the turbine shaft 16. Since the gear train 38 of the prior embodiment provided a step-up gear ratio between the speed change gear input shaft 17 and the flow brake rotor, the elimination of the gear train 38 results in lower flow brake rotor input speed. As a result, the flow brake dimensions are generally larger in this embodiment than in the prior embodiment to provide equivalent braking power.

It should be additionally noted that in lieu of the impeller brake 30 employed in the prior embodiment, an stater 28 of a torque converter 18 is retained by a switchable brake 86. With the impeller 28 switchably retained during the braking process, additional braking moment is produced in the torque converter and objectionably high engine speeds are avoided. As with the prior embodiment, a bypass clutch 36, disengaged during the braking cycle, also prevents excessive engine speeds.

As described with respect to the previous embodiment, the control of all the drive system elements to effect a braking cycle pursuant to the present invention is maintained through a controller 54 and various switching and fluid control lines under the influence of a braking program selected by the vehicle operator and reflected in the position of a program controller 78.

It should be appreciated that with respect to both embodiments, engine speed is constantly monitored by the controller 54 through the sensor 60 and the controller is programed to provide precautionary supplemental braking measures if the engine speed approaches impermissible levels. Among the programed safety measures are the automatic applications of the mechanical friction brakes 75 and/or upshift steps of the speed change gear 12.

Further, as previously mentioned, during downshifting of the speed change gear 12, the flow brake 14 is preferably evacuated or only partially filled to relieve the load on the primary side of the speed change gear. This procedure, which is under the control of the program in the controller 54, relieves strain on the shifting elements and avoids shocks during shifting.

Thus, it will be seen that there is provided a vehicle drive system with a flow brake which achieves the various features, aspects and objects of the present invention and which is well suited to meet the conditions of practical usage.

As various possible embodiments might be made of the present invention and various changes might be made in the embodiments above set forth, it is to be understood that all matter herein described or shown in the accompanying drawings is to be interpreted as illustrative and not in a limiting sense.

Having thus described the invention, there is claimed as new and desired to be secured by Letters Patent:

1. A vehicle drive system for improved braking efficiency, the system comprising a torque converter adapted to be driven by an engine, a speed change gear, control means for downshifting the speed change gear at least one speed during a braking cycle, the speed change gear including primary rotative input means, means drivingly interconnecting the torque converter and the primary input means, a bypass clutch, the bypass clutch being engaged to provide a direct drive coupling between the engine and the primary input means, control means for disengaging the bypass clutch to permit torque converter slip between the engine and the speed change gear during a braking cycle, a flow brake, the flow brake including a rotor, gear train means drivingly interconnecting the rotor and the primary input means, control means for applying the flow brake during a braking cycle, drive system further including a mechanical vehicle brake, control means for variably engaging the mechanical vehicle brake, electronic processor means for automatically actuating the speed change control means, the bypass clutch control means and the flow brake control means during a braking cycle, the electronic processor measn including means for automatically reducing but not eliminating the flow brake braking moment during speed change gear shifting to avoid shifting shocks, the electronic processor means further including means for preventing excessive engine speed during a braking cycle, the preventing means including means for monitoring the engine speed and in response to a predetermined monitored speed reducing the engine speed by actuating the mechanical vehicle brake control means to increase the braking moment of the mechanical vehicle brake or actuate the speed shift control means to upshift the speed change gear.

2. A vehicle drive system for improved braking efficiency constructed in accordance with claim 1 wherein the flow brake control means includes a fluid circuit for filling and evacuating the flow brake, the fluid circuit including an inlet line and an outlet line connected to the flow brake, the outlet line including an electrical proportional control valve, the electronic processor means including means for adjustably actuating the flow brake control means, the bypass clutch control means and the speed shift control means to maintain the total system braking moment substantially constant throughout a braking cycle or to increase the total system braking moment with increased speed.

3. A method of braking a vehicle having a drive system constructed in accordance with claim 1, the electronic processor means comprising a controller, the method comprising the steps of utilizing the controller to:
(a) actuate the flow brake;
(b) downshift the speed change gear at least one speed while simultaneously reducing but not eliminating the flow brake moment during shifting;
(c) disengage the bypass clutch;
(d) monitor the engine speed to ascertain when such speed exceeds a maximum value; and
(e) increase the braking moment of the mechanical vehicle brake when the engine speed exceeds the maximum value.

4. A method of braking a vehicle having a drive system constructed in accordance with claim 1, the electronic processor means comprising a controller, the method comprising the steps of utilizing the controller to:
(a) actuate the flow brake;
(b) downshift the speed change gear at least one speed while simultaneously reducing but not eliminating the flow brake braking moment during shifting;
(c) disengage the bypass clutch;
(d) monitor the engine speed to ascertain when such speed exceeds a maximum value; and
(e) upshift the speed change gear when the maximum speed value has been reached.

5. A vehicle drive system for improved braking efficiency, the system comprising a torque converter adapted to be driven by an engine, a speed change gear, control means for downshifting the speed change gear at least one speed during a braking cycle, the speed change gear including primary rotative input means, means drivingly interconnecting the torque converter and the primary input means, a bypass clutch, the bypass clutch being engaged to provide a direct drive coupling between the engine and the primary input means, control means for disengaging the bypass clutch to permit torque converter slip between the engine and the speed change gear during a braking cycle, a flow brake, the flow brake including a rotor, gear train means drivingly interconnecting the rotor and the primary input means, control means for applying the flow brake during a braking cycle, a motor brake, control means for engaging the motor brake during a braking cycle, the torque converter including a stator, the drive system including control means for prventing stator rotation during a braking cycle, the drive system further including a mechanical vehicle brake, control means for variably engaging the mechanical vehicle brake, electronic processor means for automatically actuating the speed shift control means, the bypass clutch control means, the motor brake control means, the stator control means and the flow brake control means during a braking cycle, the electronic processor means including means for automatically reducing but not eliminating the flow brake braking moment during speed change gear shifting to avoid shifting shocks, the electronic processor means further including means for preventing excessive engine speed during a braking cycle, the preventing means including means for monitoring the engine speed and in response to a predetermined monitored speed reducing the engine speed by actuating the mechanical vehicle brake control means to increase the braking moment of the mechanical vehicle brake or actuating the speed shift control means to upshift the speed change gear.

6. A vehicle drive system for improved braking efficiency constructed in accordance with claim 5 wherein the flow brake control means includes a fluid circuit for filling and evacuating the flow brake, the fluid circuit including an inlet line and an outlet line connected to the flow brake, the outlet line including an electrical proportional control valve, the electronic processor means including means for adjustably actuating the flow brake control means, the bypass clutch control means and the speed shift control measn to maintain the total system braking moment substantially constant throughout a braking cycle or to increase the total system braking moment with increased speed.

7. A vehicle drive system for improved braking efficiency constructed in accordance with claim 6 wherein the electronic processor means includes means for adjustably actuating the motor brake control means throughout the braking cycle to maintain the total system braking moment substantially constant or to increase the total system braking moment with increased speed.

8. A vehicle drive system for improved braking efficiency constructed in accordance with claim 6 wherein the electronic processor means includes means for adjustably actuating the stator control means throughout the braking cycle to maintain the total system braking moment substantially constant or to increase the total system braking moment with increased speed.

9. A method of braking a vehicle having a drive system constructed in accordance with claim 5, the electronic processor means comprising a controller, the method comprising the steps of utilizing the controller to:
(a) actuate the flow brake;
(b) downshift the speed change gear at least one speed while simultaneously reducing but not elminating the flow brake moment during shifting;
(c) disengage the bypass clutch;

(d) actuate the stator control means;
(e) actuate the motor brake control means;
(f) monitor the engine speed to ascertain when such speed exceeds a maximum value; and
(g) increase the braking moment of the mechanical vehicle brake when the engine speed exceeds the maximum value.

10. A method of braking a vehicle having a drive system constructed in accordance with claim 5, the electronic processor measn comprising a controller, the method comprising the steps of utilizing the controller
(a) actuate the flow brake;
(b) downshift the speed change gear at least one speed while simultaneously reducing but not eliminating the flow brake braking moment during shifting; and
(c) disengage the bypass clutch;
(d) actuate the stator control means;
(e) actuate the motor brake control means;
(f) monitor the engine speed to ascertain when such speed exceeds a maximum value; and
(g) upshift the speed change gear when the maximum speed value has been reached.

* * * * *